(12) United States Patent
Ito

(10) Patent No.: US 8,482,760 B2
(45) Date of Patent: Jul. 9, 2013

(54) COMMUNICATION APPARATUS

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1188 days.

(21) Appl. No.: 12/055,243

(22) Filed: Mar. 25, 2008

(65) Prior Publication Data
US 2008/0239379 A1    Oct. 2, 2008

(30) Foreign Application Priority Data

Mar. 30, 2007 (JP) ................................. 2007-090662

(51) Int. Cl.
*G06F 3/12* (2006.01)

(52) U.S. Cl.
USPC ....... 358/1.15; 358/3.28; 358/1.13; 358/1.14; 358/402

(58) Field of Classification Search
USPC ............ 358/1.15, 1.18, 402, 1.13, 1.14, 3.28, 358/405, 407, 434, 437; 705/51, 57; 340/853.1, 340/854.6, 856.3; 235/436, 439
See application file for complete search history.

(56) References Cited

U.S. PATENT DOCUMENTS

| | | | | |
|---|---|---|---|---|
| 5,719,924 | A * | 2/1998 | Haneda et al. | 379/100.03 |
| 6,469,797 | B2 | 10/2002 | Sakai | |
| 7,710,589 | B2 * | 5/2010 | Sodeura et al. | 358/1.15 |
| 2004/0080772 | A1 * | 4/2004 | Snyders | 358/1.14 |
| 2005/0105140 | A1 * | 5/2005 | Ozaki | 358/402 |
| 2005/0264846 | A1 | 12/2005 | Tsuzuki | |
| 2006/0044609 | A1 | 3/2006 | Kato et al. | |
| 2006/0176510 | A1 | 8/2006 | Nishizawa | |
| 2007/0253419 | A1 | 11/2007 | Oshima | |
| 2008/0204802 | A1 | 8/2008 | Tanimoto | |

FOREIGN PATENT DOCUMENTS

| | | |
|---|---|---|
| JP | H07-154563 A | 6/1995 |
| JP | H07-298022 A | 11/1995 |
| JP | H07-307825 A | 11/1995 |
| JP | H08-274862 A | 10/1996 |
| JP | 2000-059553 A | 2/2000 |
| JP | 2005-151357 A | 6/2005 |
| JP | 2005-159593 A | 6/2005 |
| JP | 2005-335282 A | 12/2005 |
| JP | 2006-031485 A | 2/2006 |
| JP | 2006-065778 A | 3/2006 |
| JP | 2006-217298 A | 8/2006 |
| JP | 2006-246284 A | 9/2006 |

(Continued)

OTHER PUBLICATIONS

Japan Patent Office; Notification of Reason for Refusal in Japanese Patent Application No. 2007-090662 mailed Apr. 28, 2009.

*Primary Examiner* — Vu B Hang
(74) *Attorney, Agent, or Firm* — Baker Botts L.L.P.

(57) ABSTRACT

A communication apparatus is provided. The communication apparatus includes an image read unit which reads image data from a transmission document; a transmission unit which transmits data; a tag read unit which wirelessly reads tag data stored in a wireless tag corresponding to the transmission document, the tag data comprising destination data indicating a first destination of the transmission document; an operation unit configured to input a second destination of the transmission document; a comparison unit which compares the first destination and the second destination; and a transmission controller which controls the transmission unit based on a comparison result of the comparison unit.

14 Claims, 10 Drawing Sheets

FOREIGN PATENT DOCUMENTS

| | | |
|---|---|---|
| JP | 2007-274523 A | 10/2007 |
| JP | 2007-095428 A | 11/2007 |
| JP | 2008-113325 A | 5/2008 |
| JP | 2008-219075 A | 9/2008 |

* cited by examiner

COMMUNICATION APPARATUS

CROSS-REFERENCE TO RELATED APPLICATION

This application claims priority from Japanese Patent Application No. 2007-090662, filed on Mar. 30, 2007, the entire subject matter of which is incorporated herein by reference.

TECHNICAL FIELD

Apparatuses consistent with the present invention relate to a communication apparatus capable of reading and transmitting image data and wireless tag data, and more particularly to a communication apparatus capable of reducing mistakes in specifying a destination to which to transmit the image data at a transmission time of the image data.

BACKGROUND

Related art facsimile machines have been proposed that seek to reduce mistakes in facsimile transmission of a transmission document. For example, JP-A-2006-246284 describes a related art copy-facsimile multifunction device.

In the related art copy-facsimile multifunction device, when image data of a transmission document is to be transmitted by facsimile, the image data is displayed on a display of an external personal computer to which the copy-facsimile multifunction device is connected. Then, using the displayed image data, a user can check the descriptions of the document and parameter settings relating to the transmission data.

However, according to the related art copy-facsimile multifunction device described in JP-A-2006-246284, one worker performs the check operation solely. Then, facsimile transmission is performed according to the judgment of one worker, and therefore, transmission mistakes such as mistakes in specifying a destination for facsimile transmission cannot reliably be reduced with the related art copy-facsimile multifunction device.

The information transmitted by facsimile may contain important information which will cause a serious problem if the information is leaked to unintended recipients. Therefore, it is advantageous to avoid such a situation in which important information is transmitted to an erroneous destination. Accordingly, according to another related art transmission system, two or more workers check the destination, and reliable facsimile transmission to the desired destination is accomplished at the time of facsimile transmission.

However, this related art transmission system requires that two or more workers use the same apparatus at the same time, and therefore, an excessive time restriction is imposed on the two or more workers, and degradation of the working efficiency of the workers is incurred.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a communication apparatus capable of reading and transmitting image data and wireless tag data, and more particularly, a communication apparatus capable of reducing mistakes in specifying a destination to which the image data is to be transmitted at the transmission time of the image data, and improving the work efficiency of a transmission worker.

According to an exemplary embodiment of the present invention, there is provided a communication apparatus comprising an image read unit which reads image data from a transmission document; a transmission unit which transmits data; a tag read unit which wirelessly reads tag data stored in a wireless tag corresponding to the transmission document, the tag data comprising destination data indicating a first destination of the transmission document; an operation unit configured to input a second destination of the transmission document; a comparison unit which compares the first destination and the second destination; and a transmission controller which controls the transmission unit based on a comparison result of the comparison unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION OF EXEMPLARY EMBODIMENTS OF THE PRESENT INVENTION

First Exemplary Embodiment

Figure 1:
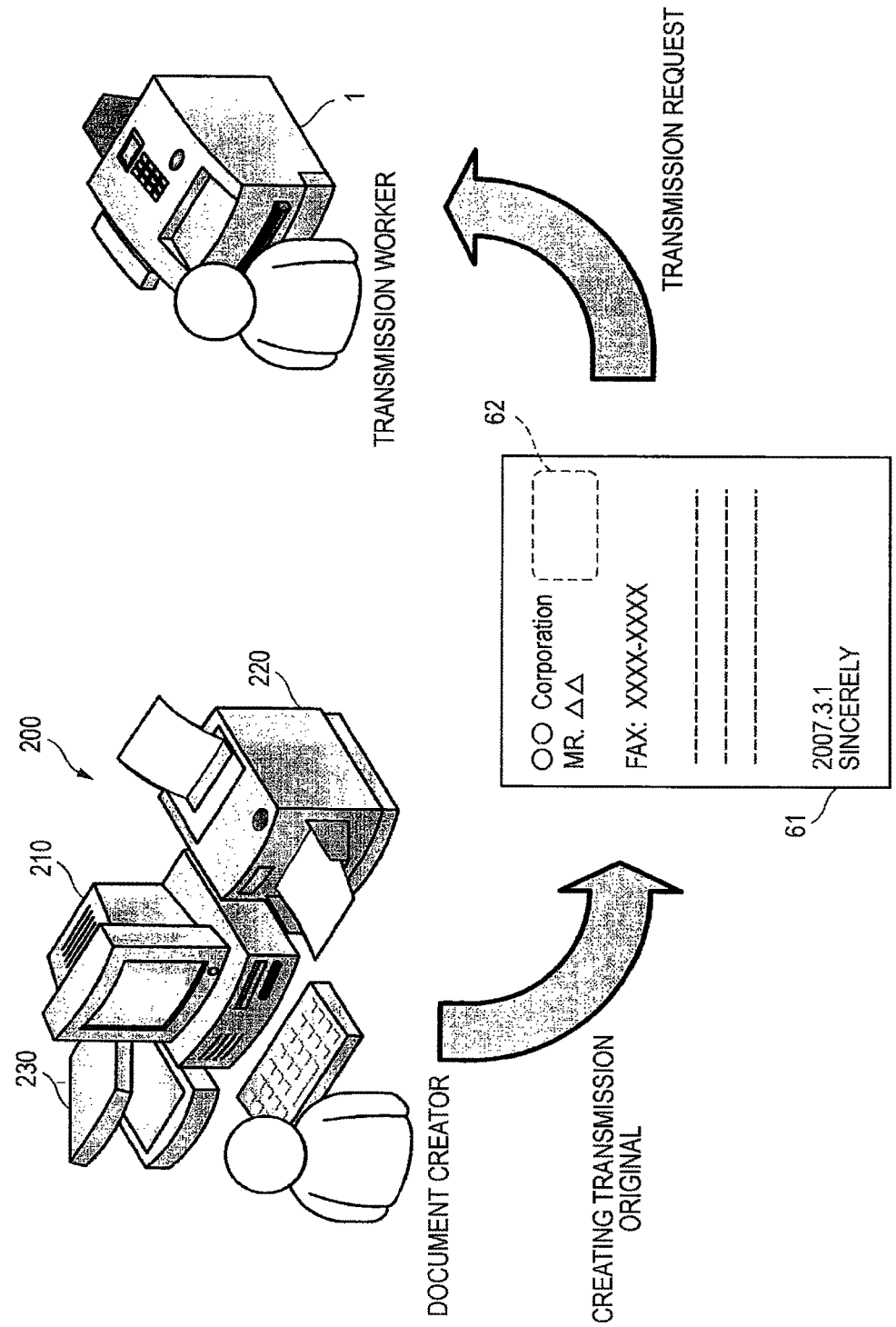
FIG. 1 is a schematic representation of facsimile transmission according to an exemplary embodiment of the present invention.

A first exemplary embodiment of the present invention will now be described in detail with reference to the accompanying drawings. The first exemplary embodiment will be described in relation to a facsimile machine. However, the present inventive concept also applies to other communication devices and multifunction devices that transmit and receive information to and from a destination. FIG. 1 is a schematic representation showing an outline of use of a facsimile machine 1 according to the first exemplary embodiment of the present invention.

As shown in FIG. 1, the facsimile machine 1 according to the first exemplary embodiment is used when a created fax document (also called transmission document 61) with a document creation system 200 is transmitted to a destination by fax.

A document creator creates the fax document using the document creation system 200. A transmission worker uses the facsimile machine 1 to transmit the fax document created by the document creator to the destination specified by the document creator.

An outline of a work flow from creation of a fax document to facsimile transmission of the fax document in the first exemplary embodiment will be discussed. As described above, a document creator uses the document creation system 200 to create a transmission document 61 recording any desired information.

A wireless tag 62 is added to the transmission document 61. The wireless tag 62 involved in the transmission document 61 may be embedded in a record sheet or may be able to be put on a record sheet with tape, etc.

Therefore, at the creation time of the transmission document 61, the document creator writes first destination data indicating the destination of the transmission document 61 intended by the document creator to the wireless tag 62.

The wireless tag mentioned herein denotes a record medium where data can be read and written in a non-contact manner, also called an IC tag or a Radio Frequency Identification (RFID) tag. The expression "wireless tag corresponding to a document" denotes a wireless tag put on a document or a wireless tag embedded in a document, for example.

When thus writing the first destination data to the wireless tag 62 and creating the transmission document 61 recording the desired information, the document creator requests a transmission worker to transmit the transmission document 61 by facsimile. At this time, the document creator reports information of an intended destination (for example, a recipient facsimile number) to the transmission worker.

The transmission worker requested to transmit the transmission document 61 by facsimile transmits the transmission document 61 through the facsimile machine 1. At this time, to transmit the transmission document to the destination by facsimile, the transmission worker operates an operation panel 17 and specifies the destination of the transmission document 61 (for example, by entering the facsimile number).

At this time, if the destination entered by the transmission worker and the destination set in the wireless tag and reported to the transmission worker by the document creator match, the data involved in the transmission document 61 is transmitted to the destination intended by the document creator.

Next, the document creation system 200 according to the first exemplary embodiment will be discussed in more detail with reference to FIGS. 1 and 2.

Figure 2:
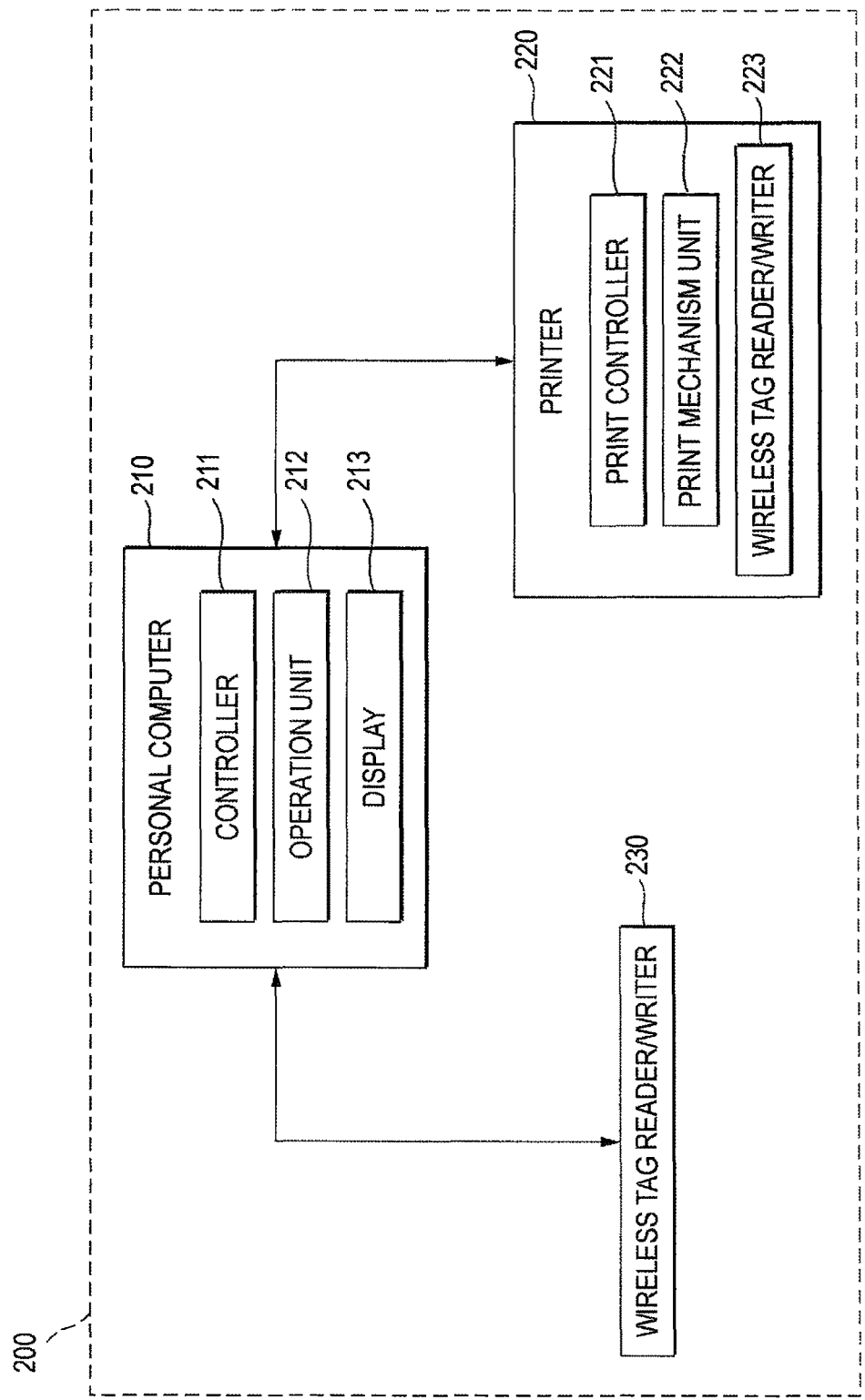
FIG. 2 is a block diagram to show a configuration of a document creation system according to an exemplary embodiment of the present invention.

The document creation system 200 used to create a fax document comprises a personal computer 210, a printer 220, and a wireless tag reader and writer 230 (see FIGS. 1 and 2).

The personal computer 210 controls the document creation system 200. It includes a controller 211, an operation unit 212, and a display 213 (see FIG. 2).

Figure 7:
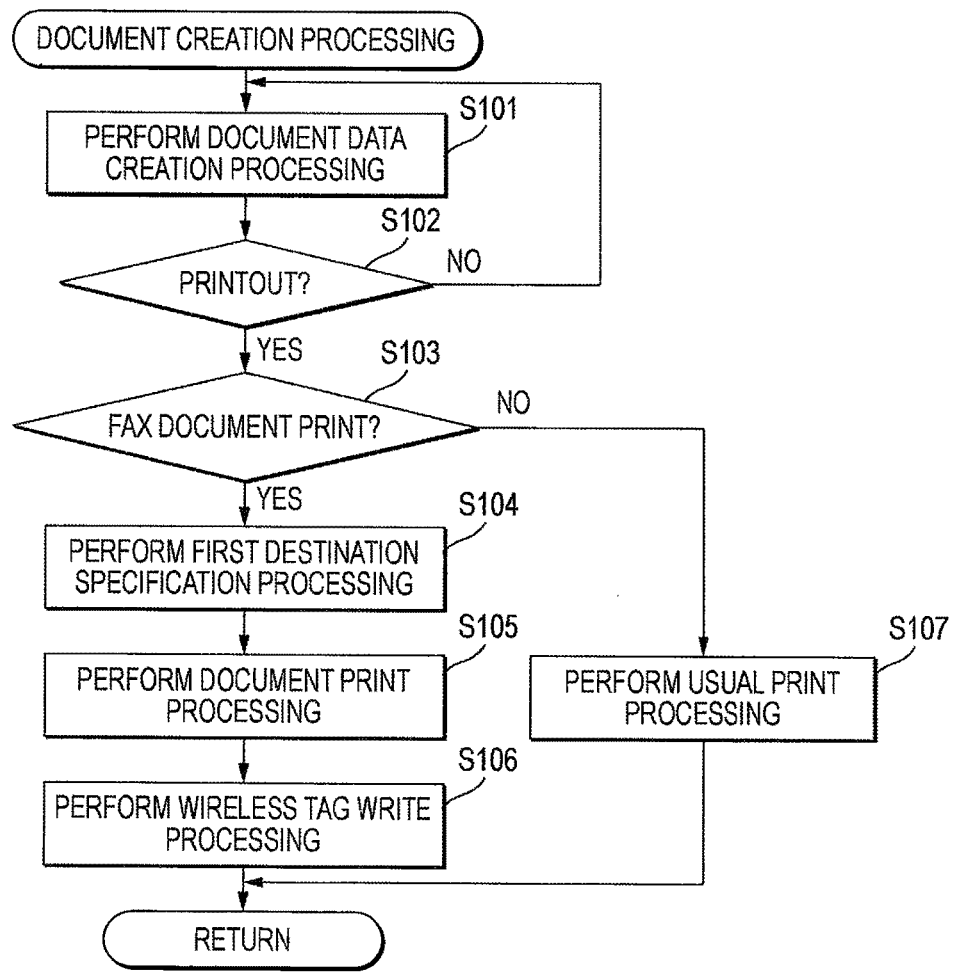
FIG. 7 is a flowchart of a document creation processing program according to an exemplary embodiment of the present invention.
Figure 9:
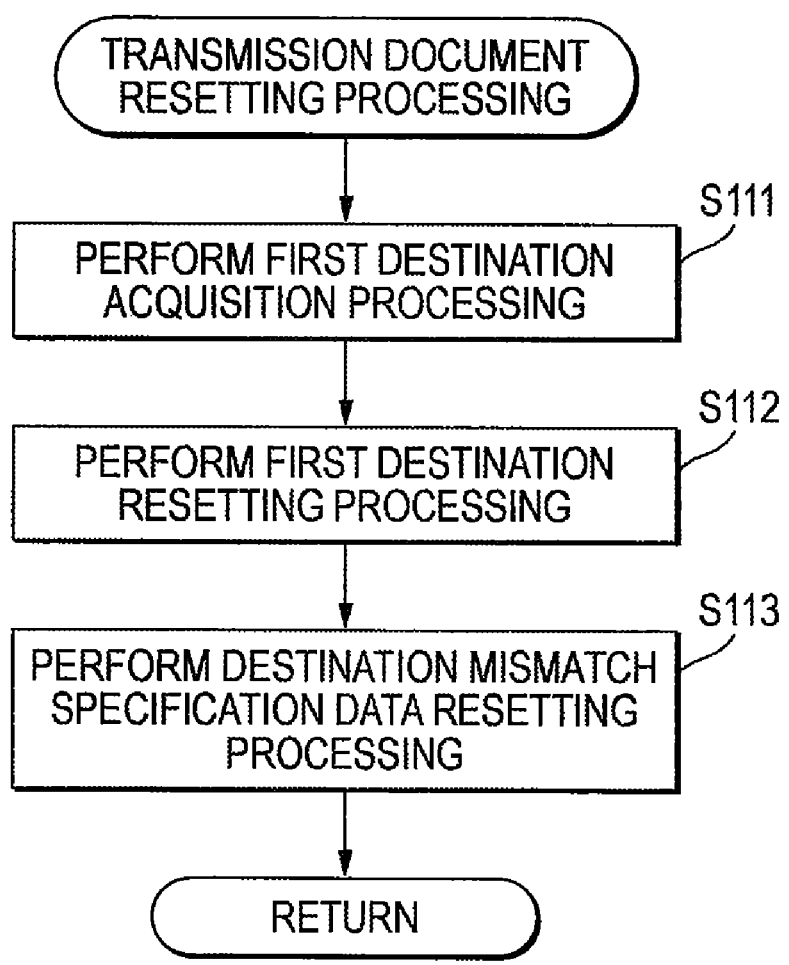
FIG. 9 is a flowchart of a transmission document resetting processing program according to exemplary embodiments of the present invention.

The controller 211 controls the document creation system 200 and executes a document creation processing program described later with reference to FIG. 7, a transmission document resetting processing program described later with reference to FIG. 9, etc. Accordingly, the personal computer 210 can control the printer 220 and the wireless tag reader and writer 230 as the components of the document creation system 200.

The operation unit 212 is an operation unit for operating the document creation system 200. Specifically, the operation unit 212 includes a keyboard, a mouse, etc., used at the document creation time. The display 213 displays the document being created, the written description to the wireless tag 62 or the storage contents of the wireless tag 62, etc. The display may be a liquid crystal display or other type of display.

The printer 220 comprises of a print controller 221, a print mechanism unit 222, and a wireless tag reader and writer 223 (see FIG. 2). The print controller 221 controls printing operation for printing created document data on a record sheet based on a signal from the personal computer 210.

The print mechanism unit 222 conveys a record sheet from a sheet storage unit through the printing operation of printing an image based on document data on the conveyed record sheet.

The sheet storage units included in the print mechanism unit 222 are a sheet storage unit which stores record sheets to each of which a wireless tag 62 is added (which will be referred to as a fax record sheet) and a sheet storage unit which stores record sheets with no wireless tag 62.

The wireless tag reader and writer 223 is used at the time of creating a fax document. That is, the wireless tag reader and writer 223 reads or writes wireless tag data from or to the wireless tag 62 of a fax record sheet at the time of creating a fax document.

The wireless tag reader and writer 230 is used at the time of reading or writing wireless tag data stored in the wireless tag 62 of the transmission document 61 after completion of the transmission document 61. Specifically, the wireless tag reader and writer 230 is used when the transmission document resetting processing program described later is executed.

Figure 3:
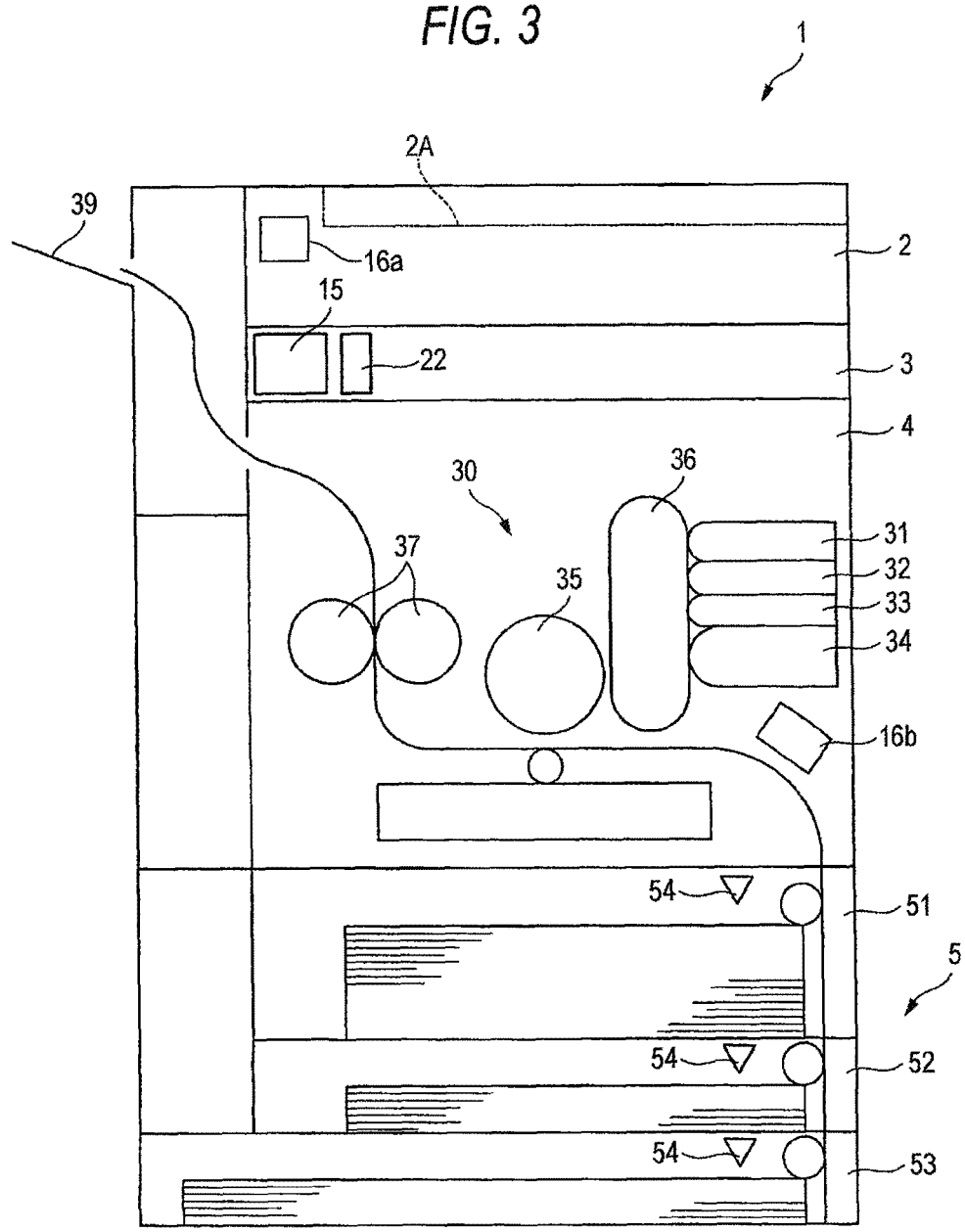
FIG. 3 is a schematic sectional view of a facsimile machine according to an exemplary embodiment of the present invention.

Next, the schematic configuration of the facsimile machine 1 according to the first exemplary embodiment will be discussed in detail with reference to the accompanying drawing. FIG. 3 is a sectional view showing the schematic configuration of the facsimile machine 1 according to the first exemplary embodiment of the invention.

As shown in FIG. 3, the facsimile machine 1 has an automatic document feeder 2, a scanner unit 3, a printer unit 4, and a sheet feed tray unit 5.

The automatic document feeder 2 includes a wireless tag writer 16a and a document placement unit 2A. The document to be transmitted by facsimile is placed on the document placement unit 2A with the document face pointing downward. When a start key (not shown) is pressed, the document is sent one page at a time and the image data is read through the scanner unit 3. After the image data is read through the scanner unit 3, the document is discharged through a document discharge slot (not shown). The wireless tag writer 16a writes data onto a wireless tag attached to the document which is read by the scanner unit 3 and discharged through the document discharge slot of the scanner unit 3, in a wireless manner.

The scanner unit 3 includes a wireless tag reader 15 and a scanner 22. If a wireless tag is added to the document sent by the automatic document feeder 2, the wireless tag reader 15 wirelessly reads data from the wireless tag.

The scanner 22 reads the image data of the document sent by the automatic document feeder 2 regardless of the presence or absence of a wireless tag.

The printer unit 4 has a wireless tag writer 16b and a laser printer 30. The wireless tag writer 16b writes data (wireless tag data described later or the like) to a wireless tag added to a record sheet fed from the sheet feed tray unit 5 in a wireless manner.

The laser printer 30 includes a Y station 31, an M station 32, a C station 33, and a K station 34. The Y station 31 stores yellow toner. Likewise, the M station 32 stores magenta toner, the C station 33 stores cyan toner, and the K station 34 stores black toner. The laser printer 30 also includes an intermediate transfer belt 36 for delivering the toner in each station to a transfer drum 35 and a fixing roller 37. A record sheet on which an image is formed by the laser printer 30 is discharged to a sheet discharge stacker 39.

The sheet feed tray unit 5 includes a first sheet feed tray 51, a second sheet feed tray 52, and a third sheet feed tray 53. A detection sensor 54 is disposed in each of the first sheet feed tray 51, the second sheet feed tray 52, and the third sheet feed tray 53. The detection sensor 54 detects the presence or absence of a wireless tag and the writable capacity of the wireless tag in each of record sheets stored in the corresponding sheet feed tray 51, 52, 53. The detection sensor 54 detects the writable capacity of the wireless tag added to one stacked record sheet.

Figure 4:
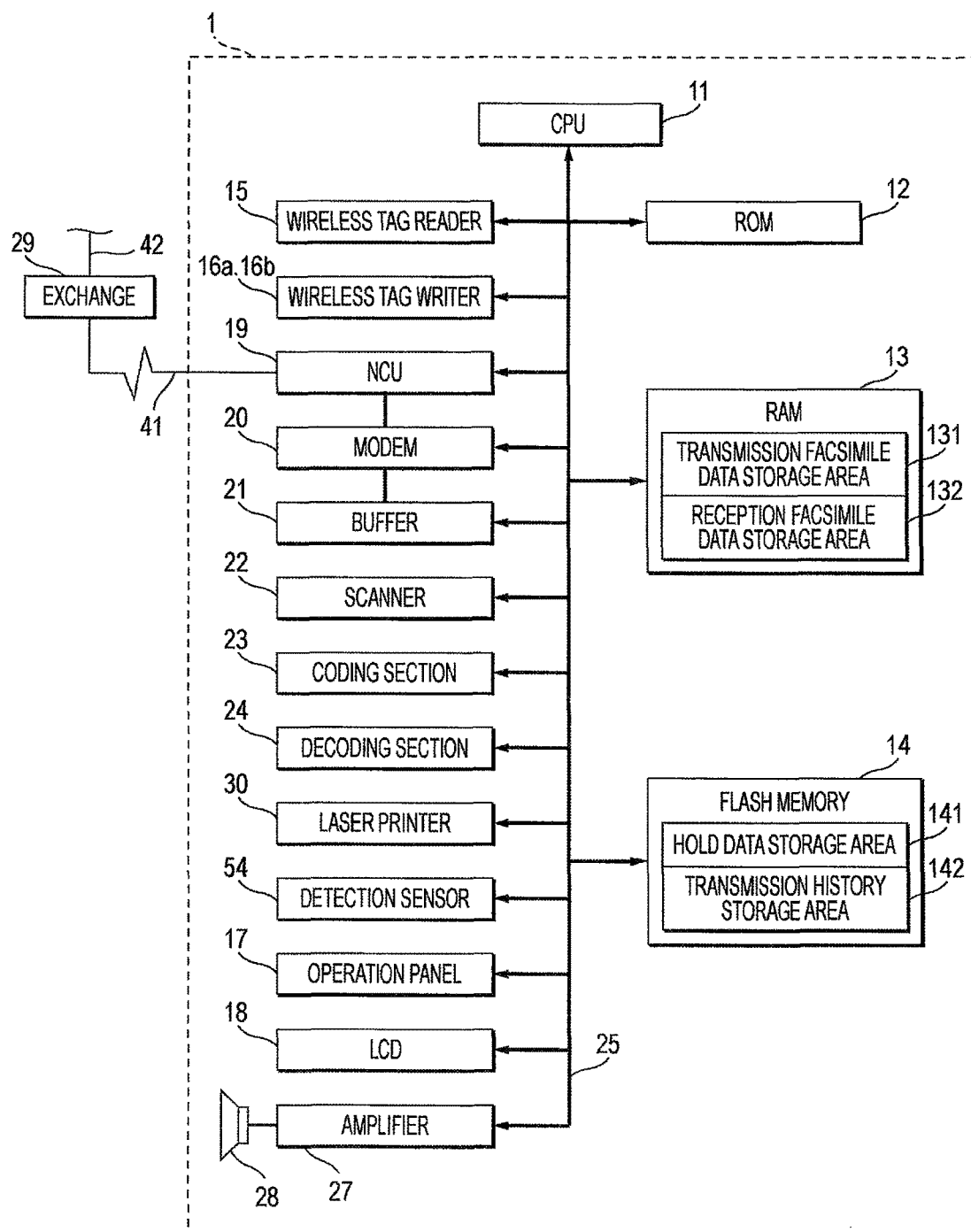
FIG. 4 is a block diagram to show a control configuration of the facsimile machine according to an exemplary embodiment of the present invention.

Next, the control configuration of the facsimile machine 1 according to the first exemplary embodiment will be discussed in detail with reference to the accompanying drawing. FIG. 4 is a block diagram to show the control configuration of the facsimile machine 1.

The facsimile machine 1 includes a central processing unit (CPU) 11, a read only memory (ROM) 12, a random access memory (RAM) 13, and a flash memory 14. The CPU 11, ROM 12, RAM 13, and flash memory are coupled through a bus line 25 together with various peripheral devices such as a network control unit (NCU) 19.

The CPU 11 of the facsimile machine 1 executes the facsimile operation, namely, data communications by controlling the components connected by the bus line 25 in accordance with various signals transmitted and received through the NCU 19 for performing line control. The ROM 12 is read-only memory storing control programs executed in the facsimile machine 1. The ROM 12 stores various control programs such as a fax transmission processing program described later with reference to FIGS. 8, 10, and 11.

The RAM 13 is memory for temporarily storing various pieces of data during execution of the operation of the facsimile machine 1. The RAM 13 includes a transmission facsimile data storage area 131 and a reception facsimile data storage area 132.

The transmission facsimile data storage area 131 stores facsimile data implemented as image data of a transmission document 61 read through the scanner 22, etc.

The reception facsimile data storage area 132 temporarily stores received facsimile data. The facsimile data stored in the reception facsimile data storage area 132 is recorded on a record sheet and then is erased.

The flash memory 14 is rewritable nonvolatile memory. The flash memory 14 is formed with a hold data storage area 141 and a transmission history storage area 142.

The hold data storage area 141 stores facsimile data read in the scanner unit 3 if the first and second destinations differ. To store facsimile data in the hold data storage area 141, the facsimile data is stored in association with document identification data according to which the transmission document 61 relating to the facsimile data can be identified.

The transmission history storage area 142 stores history data involved in facsimile transmission. As the descriptions of the history data, the name of the destination, the facsimile number of the destination, the transmission date and time, and the like are stored.

As shown in FIG. 4, the facsimile machine 1 includes the NCU 19, the wireless tag reader 15, the wireless tag writers 16a, 16b, a modem 20, a buffer 21, the scanner 22, a coding unit 23, a decoding unit 24, the laser printer 30, the detection sensors 54, the operation panel 17, an LCD 18, and an amplifier 27 as peripheral devices. The peripheral devices are also coupled together through the bus line 25.

The wireless tag reader 15 reads wireless tag data stored in the wireless tag of a document as described above. The wireless tag writers 16a, 16b write wireless tag data to a wireless tag.

The modem 20 modulates and demodulates facsimile data for transmission and also transmitting and receiving various protocol signals for transmission control. The buffer 21 is a storage unit for temporally storing data containing coded facsimile data transmitted to and received from an associated facsimile machine.

The scanner 22, which forms a part of the automatic document feeder 2 as described above, reads a document sent in page units from the document placement unit 2A and generates image data in page units.

The coding unit 23 codes the facsimile data in transmitting the facsimile data. The decoding unit 24 is a unit for reading and decoding the reception data stored in the buffer 21.

The laser printer 30 prints the image data decoded in the decoding unit 24 on a record sheet stored in any of the first sheet feed tray 51 to the third sheet feed tray 53 as described above. The detection sensor 54 is a sensor disposed in each of the first sheet feed tray 51 to the third sheet feed tray 53 for detecting the presence or absence of a wireless tag on each record sheet stored in the corresponding sheet feed tray.

The operation panel 17 comprises keys of numeric keys, the start key mentioned above, etc. When any of the keys of the operation panel 17 are operated, an input signal is transmitted to the CPU 11 and control is performed based on the input signal. For example, in the facsimile machine 1, a destination facsimile machine of facsimile transmission may be specified by operating the numeric keys.

The LCD 18 is a display implemented as a liquid crystal display. Various types of displays concerning the facsimile machine 1 are produced on the LCD 18 under the control of the CPU 11. For example, if the destination is specified using the operation panel 17, the destination number based on numeric key input is displayed on the LCD 18.

To execute facsimile transmission, the LCD 18 displays a comparison result between the input result of the transmission worker and the first destination in the wireless tag 62 (S9, S12, etc.,). A loudspeaker 28 is coupled to the amplifier 27 for outputting a ring tone, etc., from the loudspeaker 28.

Further, the facsimile machine 1 is coupled to an exchange 29 through the NCU 19 and a telephone line 41. The exchange 29 is coupled to an exchange of an associated machine through a telephone line 42 and further is coupled to the associated machine through a telephone line. Therefore, the facsimile machine 1 can transmit and receive facsimile data to and from an associated machine 60 through the telephone line 41, the exchange 29, the telephone line 42, etc.

Next, the configurations of the wireless tag 62 and the wireless tag reader 15 and the wireless tag writer 16a, 16b of the facsimile machine 1 according to the first exemplary embodiment will be discussed in detail with reference to the accompanying drawings. To begin with, the configuration of the wireless tag 62 will be discussed.

Figure 5A:
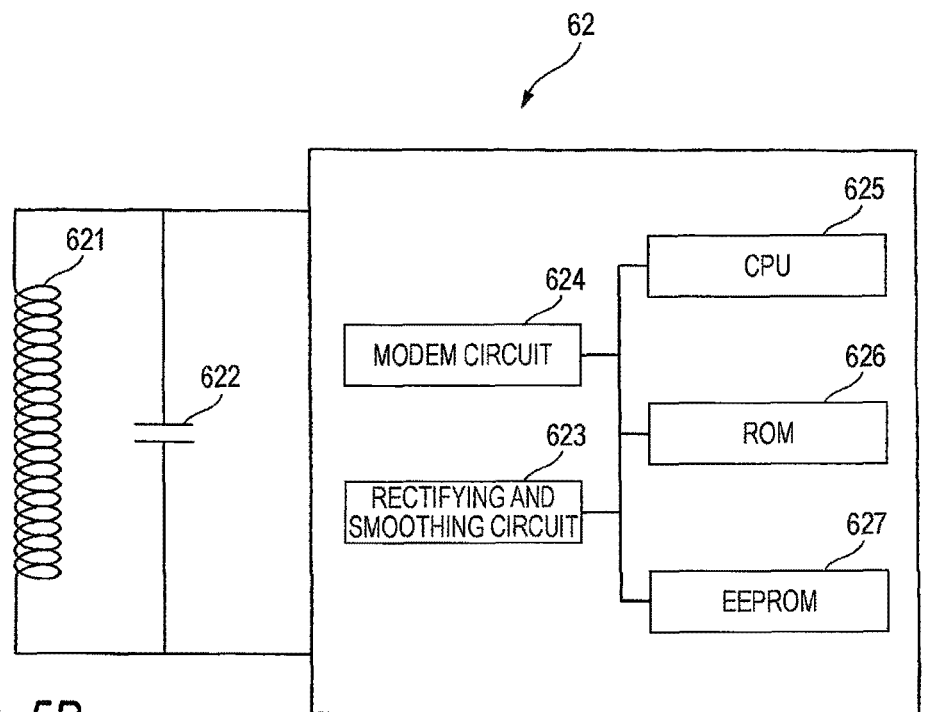
FIG. 5A is a block diagram to show a configuration of a wireless tag and FIG. 5B is a block diagram to show configurations of a wireless tag reader and a wireless tag writer.

As shown in FIG. 5A, the wireless tag 62 includes an antenna coil 621, a resonant capacitor 622, a rectifying and smoothing circuit 623, a modem circuit 624, a CPU 625, ROM 626, and EEPROM 627.

The antenna coil 621 is coupled in parallel with the resonant capacitor 622 to form a resonance circuit for receiving power radio wave vibration of a predetermined high frequency transmitted from the wireless tag reader 15 or the wireless tag writers 16a, 16b and supplying the power radio wave signal to the rectifying and smoothing circuit 623.

The rectifying and smoothing circuit 623 forms a power supply circuit. The rectifying and smoothing circuit 623 rectifies and smoothes the power radio wave signal transmitted from the resonance circuit to generate DC power of a given voltage, and supplies it to the CPU 625, etc.

The transmission signal from the wireless tag reader 15 or the wireless tag writers 16a, 16b is superposed on the power radio wave signal for transmission. The transmission signal is demodulated by the modem circuit 624 and the signal is fed into the CPU 625.

The CPU 625 operates in accordance with an operation program stored in the ROM 626 and executes predetermined processing responsive to the signal input from the modem circuit 624. That is, the CPU 625 executes write processing of writing received data into the EEPROM 627 as wireless tag data, read processing of reading wireless tag data from the EEPROM 627, demodulating the data by the modem circuit 624, and then transmits the result as a radio wave signal from the antenna coil 621, etc.

In the wireless tag 62, the rectifying and smoothing circuit 623, the modem circuit 624, the CPU 625, the ROM 626, and the EEPROM 627 are integrated into an IC chip, which is embedded in the transmission document 61 together with the antenna coil 621 and the resonant capacitor 622.

Figure 6:
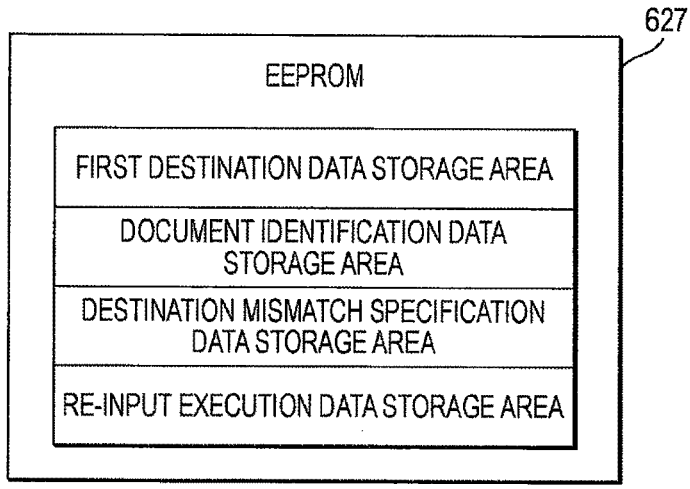
FIG. 6 is a schematic representation to show storage areas of the wireless tag of FIG. 5A.

The EEPROM 627 of the wireless tag 62 is formed with a first destination data storage area, a document identification data storage area, a destination mismatch specification data storage area, and a re-input execution data storage area (see FIG. 6).

The first destination data storage area stores first destination data. The first destination data is data indicating the destination of facsimile transmission specified by the document creator at the creation time of the transmission document 61; for example, the description of the data is the facsimile number of the destination. The first destination data is generated in first destination specification processing (S104) of the document creation processing program and is written into the first destination data storage area according to wireless tag write processing (S106). This processing will be described later.

The document identification data storage area is a storage area in which the document identification data according to which the transmission document 61 can be identified is stored, if the second destination based on inputting of the transmission worker differs from the first destination in the wireless tag 62. The document identification data stored in the document identification data storage area and the document identification data stored in the hold data storage area 141 are associated with each other so as to indicate the same transmission document 61.

The document identification data is described later in detail.

The destination mismatch specification data storage area is a storage area for storing destination mismatch specification data indicating that the second destination based on operation of the transmission worker and the first destination stored in the wireless tag 62 differ when the transmission document 61 is transmitted by facsimile. In the facsimile machine 1, transmission of the transmission document 61 is controlled according to the presence or absence of the destination mismatch specification data (S4). This process is described later in detail.

The re-input execution data storage area is a storage area for storing re-input execution data indicating that the second destination based on operation of the transmission worker and the first destination stored in the wireless tag 62 differ (NO at S25) and the transmission worker again enters the second destination when the transmission document 61 is transmitted by facsimile. The re-input execution data contains not only the data indicating re-input of the second destination, but also the input description of the second destination by the transmission worker.

The control concerning the re-input execution data is described later in detail.

Figure 5B:
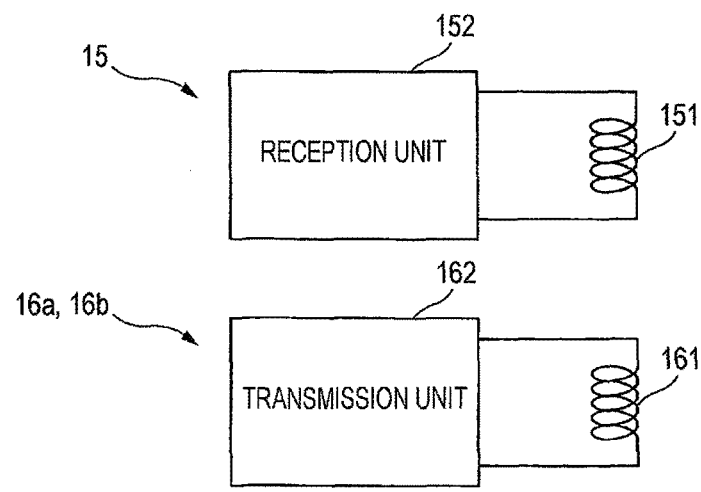

Next, the configurations of the wireless tag reader 15 and the wireless tag writer 16a, 16b according to the first exemplary embodiment will be discussed in detail with reference to the accompanying drawings. FIG. 5B is a block diagram to show the configurations of the wireless tag reader 15 and the wireless tag writers 16a and 16b.

As shown in FIG. 5B, the wireless tag reader 15 comprises a reception antenna coil 151 and a reception unit 152. Therefore, the wireless tag reader 15 can receive a radio wave signal transmitted from the wireless tag 62 at the reception antenna coil 151. The wireless tag reader 15 demodulates the radio wave signal received at the reception antenna coil 151 in the reception unit 152, thereby judging the signal to be wireless tag data. Accordingly, the wireless tag reader 15 can read the wireless tag data from the wireless tag 62.

Each of the wireless tag writers 16a, 16b comprises a transmission antenna coil 161 and a transmission unit 162. Therefore, the wireless tag writers 16a, 16b can modulate a carrier signal in the transmission unit 162 and can transmit the signal from the transmission antenna coil 161 as a power radio wave signal. Further, the wireless tag writers 16a, 16b can modulate the wireless tag data to be transmitted so as to superpose the data on the power radio wave signal in the transmission unit 162 and can transmit the data signal from the transmission antenna coil 161. Accordingly, the wireless tag writers 16a, 16b can write the wireless tag data to the wireless tag 62.

Next, the document creation processing program of the document creation system 200 according to the first exemplary embodiment will be discussed in detail with reference to the accompanying drawing. FIG. 7 is a flowchart of the document creation processing program.

To create a document using the document creation system 200, document data is created with the personal computer 210 and the created document data is output on the printer 220. Therefore, the document creation processing program is executed by the controller 211.

When execution of the document creation processing program is started, the controller 211 first executes document data creation processing (S101). In the document data creation processing (S101), the controller 211 generates document data based on operation of the operation unit 212 by the document creator.

At operation S102, the controller 211 determines whether a printout command is given based on operation of the operation unit 212. If a printout command is given (YES at S102), the controller 211 performs operation S103. On the other hand, if a printout command is not given (NO at S102), the controller 211 returns to the document data creation processing (S101). Accordingly, the document creator can correct the document data, etc., until he or she gives a printout command.

At operation S103, the controller 211 determines whether the print mode of the document data created in the document data creation processing (S101) is "fax document print" based on operation of the operation unit 212. That is, to print the document data, the controller 211 determines which of "usual print" and "fax document print" has been selected based on the operation signal from the operation unit 212. For example, when the document creator gives a printout command, a print setting screen is displayed on the display 213 and the document creator selects "usual print" or "fax document print" on the print setting screen. If "fax document print" is selected (YES at S103), the controller 211 executes operation S104. On the other hand, if "fax document print" is not selected (NO at S103), the controller 211 performs print processing (S107).

At operation S104, the controller 211 executes first destination specification processing. In the first destination specification processing (S104), the controller 211 displays a message for prompting for a destination of facsimile transmission (namely, the first destination) on the display 213, and generates first destination data based on operation of the operation unit 212 by the document creator.

When the controller 211 generates the first destination data based on operation of the operation unit 212 by the document creator, the controller proceeds to operation S105.

At operation S105, the controller 211 executes document print processing. That is, in the document print processing (S105), the controller 211 transmits a print execution signal to the printer 220 together with the document data created in the document data creation processing (S101). Accordingly, the printer 220 prints the document data on a record sheet. In the document print processing (S105), the printer 220 prints the image data on a fax record sheet to which a wireless tag 62 is added.

At operation S106, the controller 211 executes wireless tag write processing. In the wireless tag write processing (S106), the controller 211 transmits a write execution signal to the printer 220 together with initialization of document identification data, destination mismatch specification data, and re-input execution data and the first destination data generated in the first destination specification processing (S104). Then, the controller 211 terminates the document creation processing program.

Upon reception of various pieces of data including the first destination data and the write execution signal, the printer 220 writes the first destination data and the initialization of the document identification data, the destination mismatch specification data, and the re-input execution data to the wireless tag 62 with the wireless tag reader and writer 223. Specifically, in the EEPROM 627 of the wireless tag 62, the received "first destination data" is written into the first destination data storage area. Information indicating "none" is written into the document identification data storage area, the destination mismatch specification data storage area, and the re-input execution data storage area.

If fax document print is not selected (NO at S103), the process proceeds to operation S107 at which the controller 211 executes usual print processing. In this usual print processing (S107), the controller 211 transmits a print execution signal to the printer 220 together with the document data created in the document data creation processing (S101). Accordingly, the printer 220 prints the document data on a record sheet. In the usual print processing (S107), the printer 220 prints the document data on a usual record sheet with no wireless tag 62. After the usual print processing (S107) terminates, the controller 211 terminates the document creation processing program.

By executing the described document creation processing program, the document creator can get the transmission document 61 having the wireless tag 62 to which the first destination data indicating the desired destination is written and having the desired information printed.

The document creator requests a transmission worker to transmit the transmission document 61 by facsimile. At this time, the document creator reports information of the destination set as the first destination (namely, the facsimile number of the destination) to the transmission worker.

Figure 8:
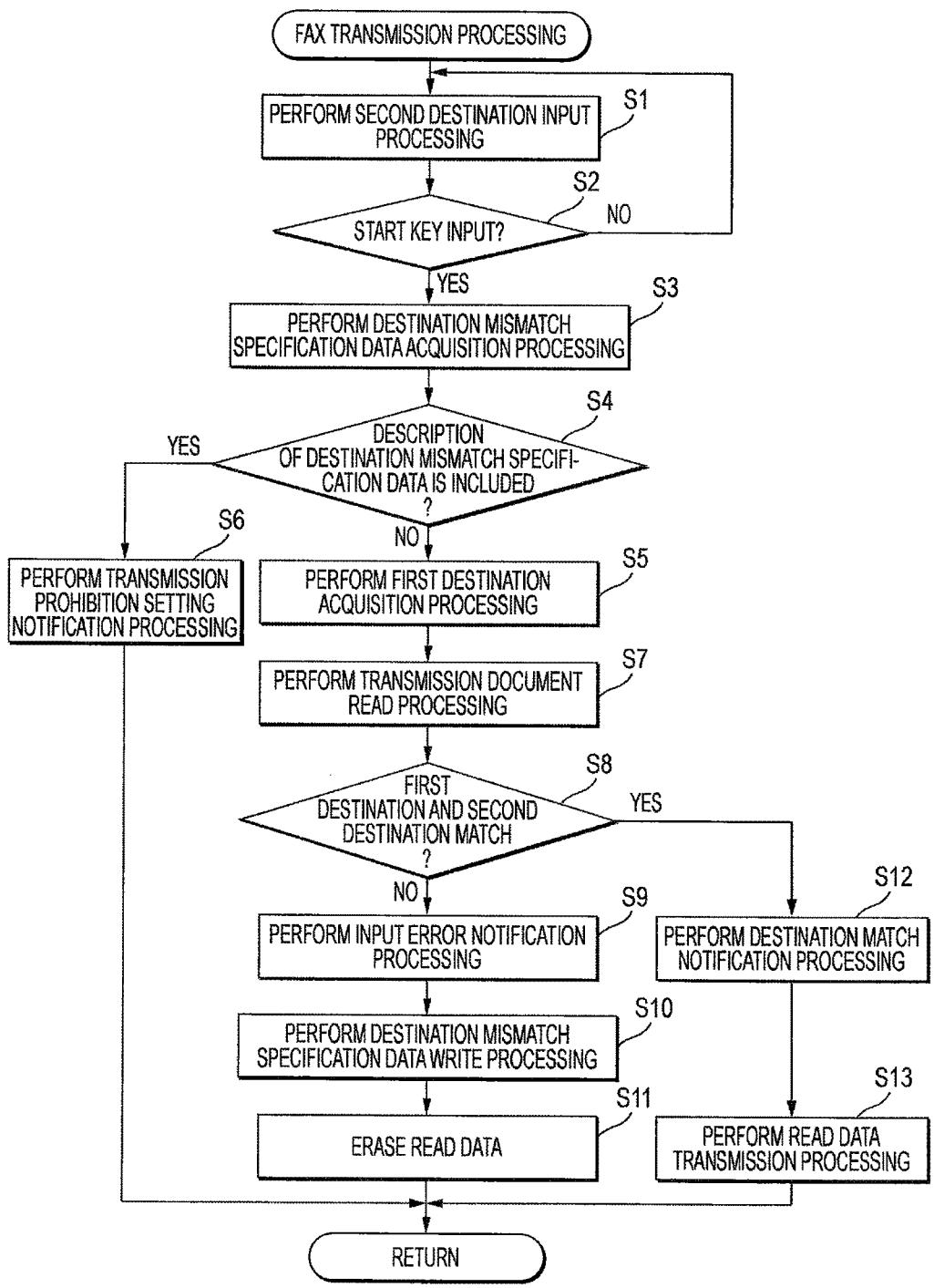
FIG. 8 is a flowchart of a fax transmission processing program according to a first exemplary embodiment of the present invention.

Next, the fax transmission processing program executed in the facsimile machine 1 when the transmission worker transmits the transmission document 61 by facsimile will be discussed in detail with reference the accompanying drawing. FIG. 8 is a flowchart of the fax transmission processing program.

To describe the fax transmission processing program, it is assumed that the transmission worker already places the transmission document 61 on the document placement unit 2A.

When execution of the fax transmission processing program is started for transmitting the transmission document 61 by facsimile, the CPU 11 executes second destination input processing (S1). That is, in the second destination input processing (S1), the CPU 11 detects operation of the operation panel 17 by the transmission worker according to a signal from the operation panel 17 and accepts specification of the second destination (S1).

At operation S2, the CPU 11 determines whether the start key is input based on a signal from the operation panel 17. If the start key is input (YES at S2), the CPU 11 proceeds to operation S3. On the other hand, if the start key is not input (NO at S2), the CPU 11 returns to operation S1. Accordingly, the transmission worker can recheck, correct, etc., the second destination entered by him or her.

At operation S3, the CPU 11 executes destination mismatch specification data acquisition processing. In this destination mismatch specification data acquisition processing (S3), the CPU 11 acquires the destination mismatch specification data from the wireless tag 62 involved in the transmission document 61 placed on the document placement unit 2A through the wireless tag reader 15.

After acquiring the description of the destination mismatch specification data (namely, "included" or "none"), the CPU 11 proceeds to operation S4.

At operation S4, the CPU 11 determines whether the description of the destination mismatch specification data written to the wireless tag 62 of the transmission document 61 is "included." If the description of the destination mismatch specification data is "included" (YES at S4), the CPU 11 proceeds to operation S6. On the other hand, if the description of the destination mismatch specification data is "none" (NO at S4), the CPU 11 proceeds to operation S5.

If the description of the destination mismatch specification data is "included," the CPU 11 proceeds to transmission prohibition setting notification processing (S6) and displays a message indicating that the transmission document 61 cannot be transmitted on the LCD 18 for notifying the transmission worker of the fact. After the transmission prohibition setting notification processing (S6), the CPU 11 terminates the fax transmission processing program without reading the transmission document 61 placed on the document placement unit 2A.

The case where the description of the destination mismatch specification data is "included" is the case where the transmission document 61 is once determined involving a mismatch between the first and second destinations (NO at S8) and does not undergo processing of the transmission document resetting processing program. That is, in this case, the destination intended by the document creator and the destination entered by the transmission worker differ and thus which destination is correct cannot be determined.

Further, since the document creator does not execute the transmission document resetting processing program, the correct destination is not checked either between the document creator and the transmission worker. Therefore, facsimile transmission of the transmission document 61 is prohibited, whereby the facsimile machine 1 can prevent facsimile transmission to an erroneous destination and can prevent the information involved in the transmission document 61 from being leaked to others.

If the description of the destination mismatch specification data is "none," the CPU 11 proceeds to operation S5 and executes first destination acquisition processing. In this first destination acquisition processing (S5), the CPU 11 acquires first destination data from the wireless tag 62 of the transmission document 61 through the wireless tag reader 15. After acquiring the first destination data and storing the first destination data in the RAM 13, the CPU 11 proceeds to operation S7.

At operation S7, the CPU 11 executes transmission document read processing. In the transmission document read processing (S7), the CPU 11 conveys the transmission document 61 placed on the document placement unit 2A to the read position of the scanner unit 3 by the automatic document feeder 2 and acquires image data of the transmission document 61 through the scanner unit 3. The CPU 11 stores the acquired image data of the transmission document 61 in the transmission facsimile data storage area 131 as facsimile data and then continues to operation S8.

At operation S8, the CPU 11 determines whether the first destination indicated by the first destination data acquired in the first destination acquisition processing (S5) and the second destination indicated by the input result in the second destination input processing (S1) match. If the first destination and the second destination match (YES at S8), the CPU 11 continues to operation S12. On the other hand, if the first destination and the second destination differ (NO at S8), the CPU 11 continues to operation S9.

At operation S9, the CPU 11 executes input error notification processing. In this input error notification processing (S9), the CPU 11 displays a message indicating that the first destination and the second destination differ and a message for requesting the document creator to check the destination on the LCD 18. After the input error notification processing (S9) terminates, the CPU 11 proceeds to operation S10.

At operation S10, the CPU 11 executes destination mismatch specification data write processing. In this destination mismatch specification data write processing (S10), the CPU 11 writes "Destination mismatch specification data: Included" to the wireless tag 62 of the transmission document 61 through the wireless tag writer 16*a*. Accordingly, facsimile transmission of the transmission document 61 is prohibited unless processing of the transmission document resetting processing program described later with reference to FIG. 9 is performed (NO at S4, S6). After the destination mismatch specification data write processing (S10), the CPU 11 proceeds to operation S11.

At operation S11, the CPU 11 erases the facsimile data read in the transmission document read processing (S7) and stored in the transmission facsimile data storage area 131. After erasing the facsimile data involved in the transmission document 61 from the transmission facsimile data storage area 131, the CPU 11 terminates the fax transmission processing program without executing facsimile transmission.

On the other hand, if the first destination and the second destination match (YES at S8), the CPU 11 continues to operation S12 and executes destination match notification processing. In this destination match notification processing (S12), the CPU 11 displays a message indicating that the first destination and the second destination match and information of the match destination (for example, the name and the facsimile number of the destination) on the LCD 18. After the destination match notification processing (S12) terminates, the CPU 11 continues to operation S13.

At operation S13, the CPU 11 executes read data transmission processing. In this read data transmission processing (S13), the CPU 11 reads the facsimile data involved in the transmission document 61, stored in the transmission facsimile data storage area 131 and transmits the facsimile data to the destination as the first destination and the second destination match.

When the read data transmission processing (S13) terminates, the CPU 11 terminates the fax transmission processing program.

Next, the transmission document resetting processing program executed in the personal computer 210 will be discussed in detail with reference the accompanying drawing. FIG. 9 is a flowchart of the transmission document resetting processing program.

As described above, if the first destination and the second destination differ (NO at S8), "Destination mismatch specification data: Included" is written to the wireless tag 62 of the transmission document 61 (S10) to prevent facsimile transmission to an erroneous destination. Accordingly, if an attempt is made to transmit the transmission document 61 by facsimile, the transmission document 61 cannot be transmitted by facsimile according to the determination at S4 (YES at S4, s6).

The transmission document resetting processing program is a processing program executed for the transmission document 61 if the transmission document 61 is not permitted to be transmitted by facsimile.

If facsimile transmission of the transmission document 61 by the fax transmission processing program results in failure, the transmission worker reports a message indicating that facsimile transmission results in failure and also carries the transmission document 61 to check the destination intended by the document creator (or the destination set in the first destination data).

The document creator receiving the transmission document 61 whose facsimile transmission results in failure places the transmission document 61 in the wireless tag reader and writer 230 and executes the transmission document resetting processing program in the personal computer 210.

When execution of the transmission document resetting processing program is started, the controller 211 transmits a wireless tag data acquisition signal to the wireless tag reader and writer 230. Accordingly, the wireless tag reader and writer 230 reads the wireless tag data containing the first destination data stored in the wireless tag 62 from the wireless tag 62 of the transmission document 61 placed in the wireless tag reader and writer 230, and transmits the wireless tag data to the personal computer 210.

Upon reception of the wireless tag data from the wireless tag reader and writer 230, the controller 211 displays the description of the received wireless tag data on the display

213. That is, the description of the first destination data is displayed on the display 213. Accordingly, the document creator can check whether the first destination is erroneous.

At operation S112, the controller 211 executes first destination resetting processing. In this first destination resetting processing (S112), the controller 211 generates new first destination data based on operation of the operation unit 212 by the document creator. The controller 211 transmits the generated new first destination data to the wireless tag reader and writer 230 together with a write signal. Accordingly, the wireless tag reader and writer 230 can update the first destination data stored in the wireless tag 62 to the new first destination data.

If the destination entered by the document creator is not erroneous as a result of checking the first destination based on the display 213, operation S112 can also be skipped.

As the first destination resetting processing (S112) is executed, the first destination data indicating the correct destination is stored in the wireless tag 62. The document creator can reliably report the correct destination to the transmission worker.

Then, at operation S113, the controller 211 executes destination mismatch specification data resetting processing. In the destination mismatch specification data resetting processing (S113), the controller 211 transmits a write signal indicating writing of "Destination mismatch specification data: None" into the destination mismatch specification data storage area to the wireless tag reader and writer 230. After transmitting the write signal to the wireless tag reader and writer 230, the controller 211 terminates the transmission document resetting processing program. As the processing is executed, the document creator rechecks the first destination.

Upon reception of the write signal from the personal computer 210, the wireless tag reader and writer 230 can update the description of the destination mismatch specification data stored in the wireless tag 62 to "Destination mismatch specification data: None."

Accordingly, if the fax transmission processing program shown in FIG. 8 is again executed, "Destination mismatch specification data: None" results (NO at S4) and thus it is made possible to transmit the transmission document 61 by facsimile provided that the updated first destination and the second destination match.

Second Exemplary Embodiment

Next, a facsimile machine 1 according to a second exemplary embodiment of the present invention will be discussed in detail with reference the accompanying drawing.

The configuration of the facsimile machine according to the second exemplary embodiment is the same as that of the facsimile machine 1 in the first exemplary embodiment. The configurations of a document creation system, a transmission document, and a wireless tag in the second exemplary embodiment are also the same as those in the first exemplary embodiment. Therefore, these configurations will not be discussed again.

The second exemplary embodiment differs from the first exemplary embodiment in the fax transmission processing program. Therefore, the fax transmission processing program according to the second exemplary embodiment of the present invention will be discussed in detail with reference the accompanying drawing. The first exemplary embodiment is processing assuming the case where specification of the first destination by the document creator is erroneous; whereas, the second exemplary embodiment is processing assuming that specification of the first destination is correct.

Figure 10:
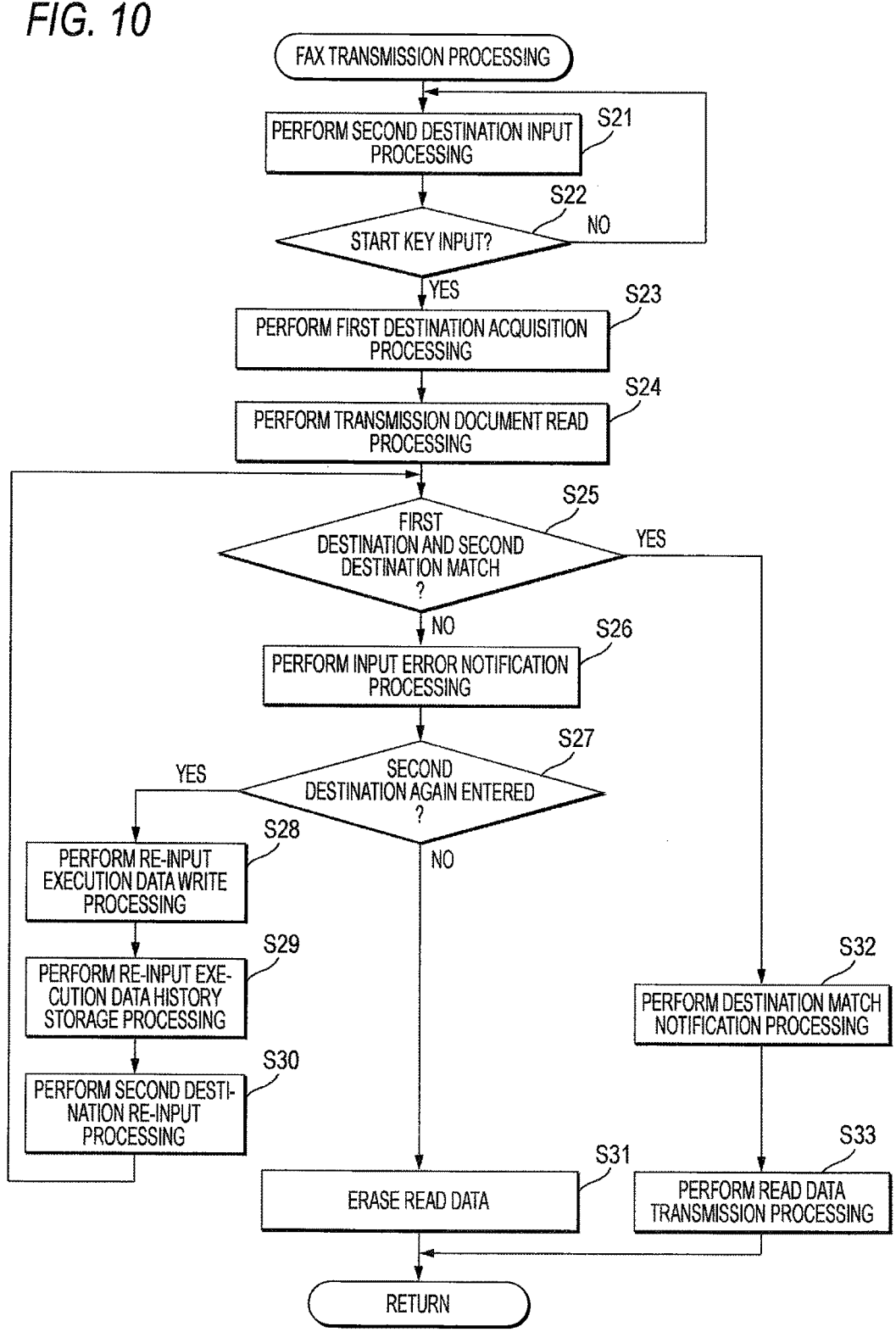
FIG. 10 is a flowchart of a fax transmission processing program according to a second exemplary embodiment of the present invention.

FIG. 10 is a flowchart of the fax transmission processing program according to the second exemplary embodiment of the present invention.

When execution of the fax transmission processing program is started, a CPU 11 executes second destination input processing (S21) and accepts input of a second destination until a start key is input (YES at S22) as in the first exemplary embodiment. The operations are already described above in relation to the first exemplary embodiment and therefore will not be discussed again in detail.

If the start key is input, the CPU 11 continues to operation S23 and executes first destination acquisition processing and then executes transmission document read processing (S24). The first destination acquisition processing (S23) and the transmission document read processing (S24) are the same as the first destination acquisition processing (S5) and the transmission document read processing (S7) in the first exemplary embodiment and therefore will not be discussed again in detail.

The CPU 11 stores first destination data in RAM 13 (S23) and stores image data of a transmission document 61 in a transmission facsimile data storage area 131 as facsimile data (S24) and then continues to operation S25.

At operation S25, the CPU 11 determines whether the first destination indicated by the first destination data acquired in the first destination acquisition processing (S23) and the second destination indicated by the input result in the second destination input processing (S21) match. If the first destination and the second destination differ (NO at S25), the CPU 11 continues to operation S26.

On the other hand, if the first destination and the second destination match (YES at S25), the CPU 11 proceeds to perform destination match notification processing (S32). After the destination match notification processing (S32) terminates, the CPU 11 executes read data transmission processing (S33). The destination match notification processing (S32) and the read data transmission processing (S33) are similar to the destination match notification processing (S12) and the read data transmission processing (S13) in the first exemplary embodiment and therefore will not be discussed again in detail. When the read data transmission processing (S33) terminates, the CPU 11 terminates the fax transmission processing program.

At operation S26, the CPU 11 executes input error notification processing. This input error notification processing (S26) is similar to the input error notification processing (S9) in the first exemplary embodiment. Therefore, the input error notification processing (S26) will not be discussed again in detail. After displaying a message indicating that the first destination and the second destination differ and a message for requesting the document creator to check the destination on an LCD 18, the CPU 11 goes to S27.

At operation S27, the CPU 11 determines whether the second destination is be entered again. Specifically, the CPU 11 displays a message for inquiring whether the second destination will be entered again on the LCD 18, and makes a determination at operation S27 based on operation of an operation panel 17 performed by the user in response to the display. If the second destination is to be again entered (YES at S27), the CPU continues to operation S28.

On the other hand, if the second destination is not again entered (NO at S27), the CPU 11 erases the facsimile data stored in the transmission facsimile data storage area 131 (S31). After erasing the facsimile data involved in the transmission document 61 from the transmission facsimile data storage area 131, the CPU 11 terminates the fax transmission processing program without executing facsimile transmission.

At operation S28, the CPU 11 executes re-input execution data write processing. In this re-input execution data write processing (S28), the CPU 11 generates re-input execution data comprising an indication of re-input of the second destination and the input description of the second destination by the transmission worker (namely, the facsimile number of the destination entered by the transmission worker, etc.,) and writes the re-input execution data into a re-input execution data storage area of a wireless tag 62 of the transmission document 61 through the wireless tag reader 15. After writing the re-input execution data into the wireless tag 62 of the transmission document 61, the CPU 11 continues to operation S29.

At operation S29, the CPU 11 executes re-input execution data history storage processing. In this re-input execution data history storage processing (S29), the CPU 11 adds the same data as the re-input execution data generated in the re-input execution data write processing (S28) to transmission history data indicating facsimile transmission of the transmission document 61 for storage in a transmission history storage area 142. After the re-input execution data history storage processing (S29) terminates, the CPU 11 continues to operation S30.

At operation S30, the CPU 11 executes second destination re-input processing. In this second destination re-input processing (S30), the CPU 11 accepts re-input of the second destination by the transmission worker based on operation of the operation panel 17. The second destination re-input processing (S30) is similar to the second destination input processing (S1, S21). Therefore, the second destination re-input processing (S30) will not be discussed again in detail.

After the second destination re-input processing (S30) terminates, the CPU 11 returns to operation S25. Accordingly, a comparison is made between the re-entered second destination and the first destination stored in the wireless tag 62 of the transmission document 61 and if the re-entered second destination and the first destination match (YES at S25), the transmission document 61 is transmitted by facsimile (S33).

According to the second exemplary embodiment of the present invention, the transmission worker can find an error in the first input of the second destination and can enter the correct second destination on the spot, thereby immediately executing facsimile transmission to the correct destination.

Third Exemplary Embodiment

A third exemplary embodiment of the present invention will now be discussed in detail with reference the accompanying drawing.

The configuration of the facsimile machine according to the third exemplary embodiment is the same as that of the facsimile machine 1 in the first exemplary embodiment and the second exemplary embodiment. The configurations of a document creation system, a transmission document, and a wireless tag in the third exemplary embodiment are also the same as those in the first exemplary embodiment and the second exemplary embodiment. Therefore, these configurations will not be discussed again.

Figure 11:
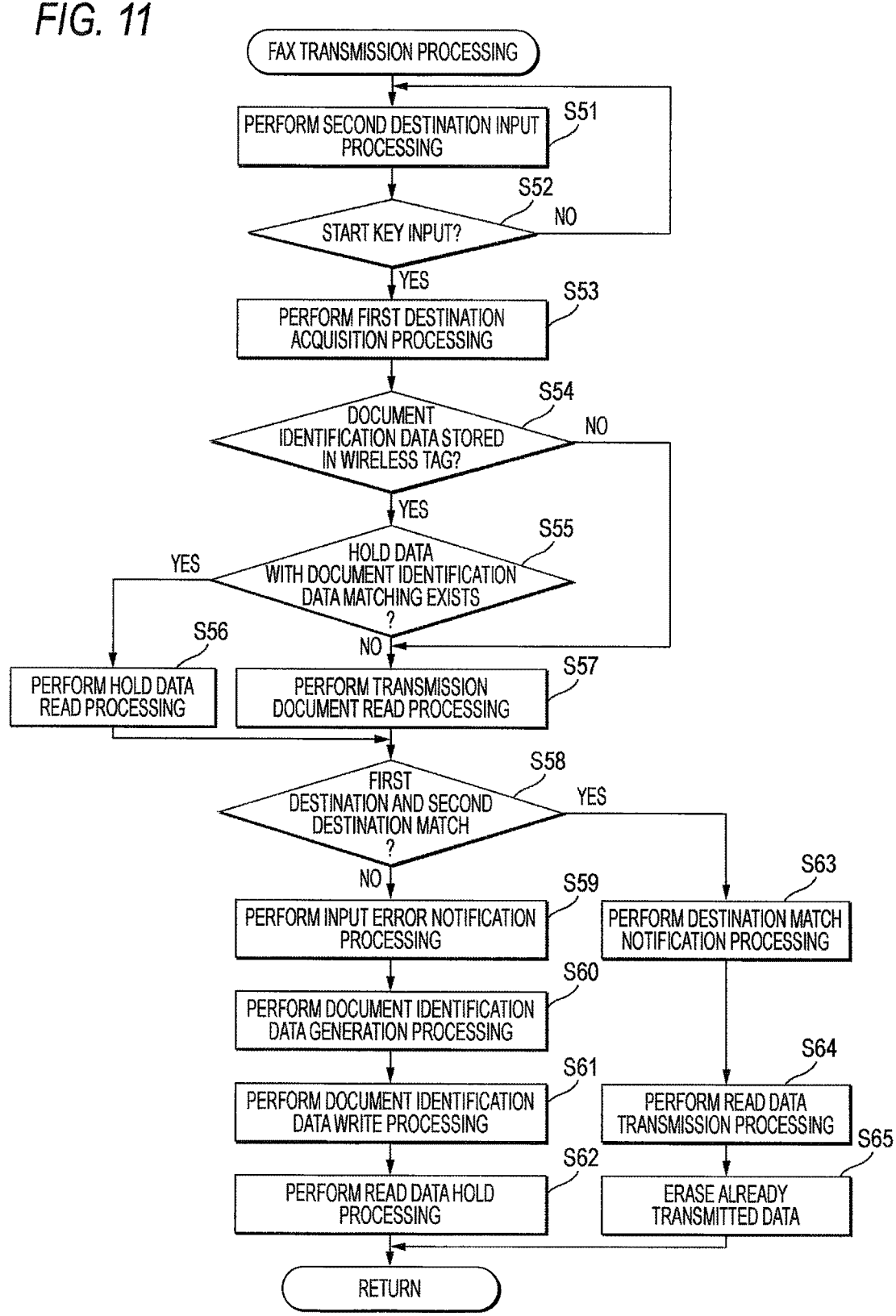
FIG. 11 is a flowchart of a fax transmission processing program according to a third exemplary embodiment of the present invention.

The third exemplary embodiment differs from the first exemplary embodiment and the second exemplary embodiment in the fax transmission processing program. Therefore, the fax transmission processing program will be discussed in detail with reference the accompanying drawing. FIG. 11 is a flowchart of the fax transmission processing program according to the third exemplary embodiment of the present invention.

When execution of the fax transmission processing program is started, a CPU 11 executes second destination input processing (S51) and accepts input of a second destination until a start key is input (YES at S52) as in the first exemplary embodiment. The steps are already described in the first exemplary embodiment and therefore will not be discussed again in detail.

If the start key is input, the CPU 11 continues to operation S53 and executes first destination acquisition processing and then proceeds to operation S54. The first destination acquisition processing (S53) is the same as the first destination acquisition processing (S5, S23) in the first exemplary embodiment and the second exemplary embodiment and therefore will not be discussed again in detail.

At operation S54, the CPU 11 determines whether document identification data is stored in a wireless tag 62 of a transmission document 61. Specifically, the CPU 11 makes a determination at S54 by referencing a document identification data storage area through a wireless tag reader 15.

The document identification data is data according to which the transmission document 61 can be identified and indicates the correspondence between the transmission document 61 and facsimile data involved in the transmission document 61 held in a hold data storage area 141 (which will be hereinafter referred to as hold data) according to document identification data write processing (S61) and read data holding processing (S62) described later.

If document identification data is stored in the wireless tag 62 (YES at S54), the CPU 11 continues to operation S55. On the other hand, if document identification data is not stored in the wireless tag 62 (NO at S54), the CPU 11 proceeds to transmission document read processing (S57).

At operation S55, the CPU 11 determines whether the document identification data read from the wireless tag 62 and hold data with document identification data matching the document identification data read from the wireless tag 62 exist in the hold data storage area 141. Specifically, the CPU 11 references the document identification data of each facsimile data stored in the hold data storage area 141 and determines whether the document identification data matches the document identification data acquired through the wireless tag reader 15 in hold data units.

If hold data with document identification data matching exists (YES at S55), the CPU 11 continues to hold data read processing (S56). On the other hand, if hold data with document identification data matching does not exist (NO at S55), the CPU 11 continues to transmission document read processing (S58).

At operation S56, the CPU 11 executes hold data read processing. In this hold data read processing (S56), the CPU reads the hold data with which the document identification data matching the document identification data read from the wireless tag 62 of the transmission document 61 is associated from the hold data storage area 141, and stores the hold data in a transmission facsimile data storage area 131. After the hold data read processing (S56) terminates, the CPU 11 continues to operation S58. It is assumed that the hold data is erased from the hold data storage area 141 as it is read.

On the other hand, at operation S57, the CPU 11 executes transmission document read processing (S57). The transmission document read processing (S57) is the same as the transmission document read processing (S7, S24) in the first exemplary embodiment and the second exemplary embodiment. Therefore, the transmission document read processing (S57)

will not be discussed again in detail. After the transmission document read processing (S57) terminates, the CPU continues to operation S58.

At operation S58, the CPU 11 determines whether the first destination indicated by the first destination data acquired in the first destination acquisition processing (S53) and the second destination indicated by the input result in the second destination input processing (S51) match. If the first destination and the second destination differ (NO at S58), the CPU 11 continues to operation S59. On the other hand, if the first destination and the second destination match (YES at S58), the CPU 11 continues to destination match notification processing (S63).

At operation S59, the CPU 11 executes input error notification processing. This input error notification processing (S59) is similar to the input error notification processing (S9, S26) in the first exemplary embodiment and the second exemplary embodiment. Therefore, the input error notification processing (S59) will not be discussed again in detail. After the CPU 11 displays a message indicating that the first destination and the second destination differ and a message for requesting the document creator to check the destination on the LCD 18, the CPU 11 continues to operation S60.

At operation S60, the CPU 11 executes document identification data generation processing and generates document identification data written into the wireless tag 62 of the transmission document 61 and associated with the facsimile data based on the transmission document 61. After generating the document identification data, the CPU 11 continues to operation S61.

At operation S61, the CPU 11 executes document identification data write processing. In the document identification data write processing (S61), the CPU 11 writes the document identification data generated in the document identification data generation processing (S60) into the wireless tag 62 of the transmission document 61 using a wireless tag writer 16a. After writing the document identification data into the wireless tag 62, the CPU continues to operation S62.

To execute the document identification data write processing (S61), the CPU 11 sets a protection setting to prohibit data write for a document identification data storage area of the wireless tag 62. Accordingly, later change in the document identification data is prevented and the correspondence between the transmission document 61 and the hold data stored in the hold data storage area 141 is not destroyed. Accordingly, the facsimile machine 1 can read and transmit the hold data having the same descriptions as the transmission document 61 by referencing the document identification data of the transmission document 61.

At operation S62, the CPU 11 executes read data hold processing. In this read data hold processing (S62), the CPU 11 stores the facsimile data involved in the transmission document 61 stored in the transmission facsimile data storage area 131 in the hold data storage area 141 as hold data. The third exemplary embodiment differs from the first exemplary embodiment or the second exemplary embodiment in that if the first destination and the second destination differ, the read facsimile data is left without being erased although the read facsimile data cannot be transmitted. This eliminates the need for again reading the same transmission document 61. At this time, the document identification data generated in the document identification data generation processing (S60) is associated with the facsimile data. After the read data hold processing (S62) terminates, the CPU 11 terminates the fax transmission processing program.

That is, the document identification data written into the wireless tag 62 of the transmission document 61 in the document identification data write processing (S61) and the document identification data of the hold data involved in the transmission document 61 stored in the hold data storage area 141 are the same. Accordingly, in the hold data read processing (S56), the facsimile machine 1 can read the facsimile data based on the transmission document 61 to be transmitted by the transmission worker from the hold data storage area 141.

On the other hand, if the first destination and the second destination match (YES at S58), the CPU 11 continues to operation S63 and execute destination match notification processing. After the destination match notification processing (S63) terminates, the CPU 11 executes read data transmission processing (S64). The destination match notification processing (S63) and the read data transmission processing (S64) are similar to the destination match notification processing (S12, S22) and the read data transmission processing (S13, S33) and therefore will not be discussed again in detail. When the read data transmission processing (S64) terminates, the CPU 11 continues to operation S65.

At operation S65, the CPU 11 erases the facsimile data transmitted according to the read data transmission processing (S64). If the facsimile data read from the transmission document 61 according to the transmission document read processing (S57) is transmitted, the CPU 11 erases the facsimile data in the transmission facsimile data storage area 131.

At the termination of erasing the already transmitted facsimile data, the CPU 11 terminates the fax transmission processing program.

As described above, according to the facsimile machine 1 of an exemplary embodiment of the present invention, to transmit the facsimile data acquired in the scanner unit 3, if the first destination set in the wireless tag 62 and the second destination entered by the transmission worker match (YES at S8, YES at S25, YES at S58), it is made possible to transmit the facsimile data to the destination by facsimile (S13, S33, S64). That is, input of the first destination is requested twice at the time of setting the first destination by the document creator and at the time of entering the second destination by the transmission worker. Accordingly, the facsimile machine 1 enables two or more persons to be involved in specification of the destination of the facsimile transmission, so that facsimile transmission to an erroneous destination caused by a destination specification mistake, etc., can be prevented and facsimile transmission can be reliably executed to any desired destination.

According to the facsimile machine 1 of an exemplary embodiment of the present invention, to execute facsimile transmission, it is not necessary for two or more persons (for example, the document creator and the transmission worker) to exist in front of the facsimile machine at the same time, so that degradation of the working efficiency accompanying facsimile transmission can be prevented. That is, the document creator and the transmission worker are free of time restriction to execute facsimile transmission.

According to the facsimile machine 1, if the first destination and the second destination differ (NO at S8, NO at S25, NO at S58), facsimile transmission of the transmission document 61 is stopped. The facsimile machine 1 does not transmit the facsimile data to an erroneous destination by facsimile and can give an opportunity for the transmission worker to check the destination.

Further, in the facsimile machine 1, if the first destination and the second destination differ (NO at S8, NO at S25, NO at S58), a message indicating that the first destination and the second destination differ is displayed on the LCD 18 according to the input error notification processing (S9, S26, S59).

Accordingly, the facsimile machine 1 can inform the transmission worker performing operation through the operation unit that the facsimile transmission has been stopped, and can provide an opportunity for the document worker to check the destination. That is, the facsimile machine 1 can reliably provide an opportunity for the transmission worker to keep track of the correct destination, and facsimile transmission to an erroneous destination can be prevented.

According to the facsimile machine 1 of an exemplary embodiment of the present invention, if the first destination and the second destination differ (NO at S8, NO at S25, NO at S58), destination mismatch specification data is written into the wireless tag 62 of the transmission document 61 (S10). The document creator can determine the cause of a transmission error involved in facsimile transmission and can check to ensure that setting of the first destination does not contain any error by executing the transmission document resetting processing program.

If the destination mismatch specification data is read from the wireless tag 62, facsimile transmission of the transmission document is prohibited. That is, transmission of the transmission document 61 whose destination remains unconfirmed is not permitted and facsimile transmission to an erroneous destination can be prevented more reliably.

In the facsimile machine 1 according to an exemplary embodiment of the present invention, if the first destination and the second destination differ (NO at S8, NO at S25, NO at S58), an opportunity to again enter the second destination can be given to the transmission worker. The facsimile machine 1 can execute facsimile transmission based on the transmission document 61 based on re-input of the second destination. Accordingly, the facsimile machine 1 can relieve a delay of facsimile transmission work while preventing facsimile transmission to an erroneous destination. For example, an error is caused by a specification mistake of the second destination, it is made possible to again enter the correct second destination immediately according to the determination of the transmission worker, and smooth facsimile transmission can be executed.

According to the facsimile machine 1 of an exemplary embodiment of the present invention, to again enter the second destination (YES at S27), re-input execution data is written into the wireless tag 62 of the transmission document 61 according to the re-input execution data write processing (S28). The document creator can check the re-input execution data by the personal computer 210 using the wireless tag reader and writer 230. That is, according to the facsimile machine 1, the document creator can keep track of re-input of the destination and an opportunity to check an error in setting of the first destination can be given.

Further, according to the facsimile machine 1 of an exemplary embodiment of the present invention, to again enter the second destination (YES at S27), re-input execution data is stored in association with the facsimile transmission of the transmission document 61 in the transmission history storage area 142 according to the re-input execution data history storage processing (S29). Accordingly, the facsimile machine 1 according to an exemplary embodiment of the present invention makes it possible to keep track of the number of destination specification mistakes from the storage contents of the transmission history storage area 142, and work management concerning the document creator and the transmission worker can be conducted.

According to the facsimile machine 1 of an exemplary embodiment of the present invention, if facsimile transmission is stopped (NO at S58), the facsimile data based on the transmission document 61 is held in the hold data storage area 141 according to the read data hold processing (S62). Document identification data is given to the hold data (S61). The same document identification data is written into the wireless tag 62 of the transmission document 61.

To perform facsimile transmission work again after checking the destination of the transmission document 61, the facsimile data stored in the hold data storage area 141 is read based on the document identification data (S56). That is, the transmission document read processing (S57) is not again executed for the transmission document 61. Accordingly, the facsimile machine 1 can make the most of the hold data to skip the transmission document read processing (S57) and can improve the work efficiency for the facsimile transmission.

The document identification data is generated (S60) if facsimile transmission is stopped (NO at S58) and the facsimile data based on the transmission document 61 is held in the hold data storage area 141. The facsimile machine 1 writes the generated document identification data into the wireless tag 62 of the transmission document 61 (S61). That is, the facsimile machine 1 eliminates the need for presetting document identification data at the creation time of the transmission document 61. Consequently, the burden on the document creator can be lightened.

To write the document identification data (S61), the facsimile machine 1 sets a protection setting to prohibit data write for the document identification data storage area of the wireless tag 62. Accordingly, later change in the document identification data is prevented and the correspondence between the transmission document 61 and the hold data stored in the hold data storage area 141 is not destroyed. Accordingly, the facsimile machine 1 according to an exemplary embodiment of the present invention can reliably read and transmit the hold data having the same descriptions as the transmission document 61 by referencing the document identification data of the transmission document 61.

Although the invention has been described above with respect to certain exemplary embodiments, it is to be understood that the invention is not limited to the specific exemplary embodiments thereof and various modifications and changes may be made without departing from the spirit and the scope of the invention.

For example, in the exemplary embodiments, the fax transmission processing program according to the first exemplary embodiment, the fax transmission processing program according to the second exemplary embodiment, and the fax transmission processing program according to the third exemplary embodiment have been described as separate processing programs, but can also be integrated into one fax transmission processing program. In this case, it is advantageous that appropriate processing should be selected according to the information entered by the transmission worker and the descriptions of the data read from the wireless tag 62.

In the first to third exemplary embodiments, facsimile transmission to the destination is permitted provided that the second destination entered by the transmission worker and the first destination specified by the document creator always match. However, if an error occurs, which of the first and second destinations is erroneous is known and thus the first destination and the second destination need not necessarily be harmonized in the transmission work after acknowledgement of the error. Particularly if the first destination is erroneous, the descriptions of the wireless tag 62 must be changed and if the document creator is absent, the trouble cannot immediately be dealt with. In this case, a higher priority is given to measures so that facsimile transmission is not left undone and it is advantageous that the trouble should be flexibly dealt with in the processing of the first to third exemplary embodiments.

In the first exemplary embodiment, if "Destination mismatch specification data: Included" is stored in the wireless tag 62 (YES at S4), transmission of the transmission document 61 is prohibited according to the transmission prohibition setting notification processing (S6), but the invention is not limited to the mode. For example, in this case (YES at S4), the possibility that the first destination specified by the document creator may be erroneous and "Destination mismatch specification data: Included" may result is also considered. Thus, if the document creator requests the transmission worker to check to ensure that the destination is correct, "Destination mismatch specification data: Included" may be released based on predetermined operation of the operation panel 17 by the transmission worker so that the transmission document is transmitted to the correct destination entered through the operation panel 17 by facsimile. At the time, the determination processing at S8 is skipped. At the time, the transmission document 61 may be or may not be subjected to execution of the transmission document resetting processing program.

In the facsimile machine 1 according to the second exemplary embodiment, when the second destination is again entered (S30), the first destination and the second destination also need to match (YES at S25), but the invention is not limited to the mode. For example, to again enter the second destination, if the transmission worker checks with the document creator for the correct destination, it is considered that the again entered second destination is correct. Thus, facsimile transmission of the transmission document 61 may be executed. In this case, if the document creator is absent, the transmission worker can quickly transmit the transmission document 61 by facsimile and rapid transmission of information is made possible.

That is, if the first destination is erroneous, a state can occur in which facsimile transmission cannot be started unless the first destination in the wireless tag 62 is corrected. Thus, when the document creator is absent, facsimile transmission is left undone. Also in this case, it is assumed that the again entered second destination is reliable, and facsimile transmission may be started without performing the determination processing at S25.

In the third exemplary embodiment, the second destination input processing (S51) is performed and then the wireless tag 62 is read and the first destination is acquired, but the invention is not limited to the mode. For example, if specification of the first destination by the document creator is erroneous and an error occurs, the first destination is corrected and then the wireless tag 62 is again read, whereby it is made possible to acquire the document identification data to identify the hold data (written into the wireless tag 62 at the error occurrence time) and the correct destination. Thus, it can also be considered that the second destination need not be entered. In this case, the process flow may be started at the first destination acquisition processing (S53) and the input work burden on the transmission worker can be lightened. At the time, the determination processing at S58 is skipped.

In the transmission document 61 of the facsimile machine 1 according to the exemplary embodiments, the document identification data is not stored in the document identification data storage area of the wireless tag 62 at the creation time of the transmission document 61, but the invention is not limited to the mode. That is, it is also possible for the document creator to write the document identification data into the wireless tag 62 and it is also possible to add the wireless tag 62 into which the document identification data is previously written to the transmission document 61.

What is claimed is:

1. A communication apparatus comprising:
   an image read unit configured to generate image data by reading an image formed on a transmission document;
   a transmission unit configured to transmit data;
   a tag read unit configured to wirelessly read tag data stored in an RFID tag provided with the transmission document, the tag data comprising destination data indicating a first destination of the transmission document;
   a tag write unit configured to wirelessly write data into the RFID tag;
   an operation unit configured to input a second destination of the transmission document;
   a comparison unit configured to compare the first destination read from the RFID tag and the second destination input via the operation unit;
   a transmission controller configured to control the transmission unit based on a comparison result of the comparison unit, wherein, if the first destination and the second destination are different from each other, the transmission controller controls the transmission unit to stop a first transmission of the image data and further controls the tag write unit to write error data indicating that the first transmission of the image data of the transmission document is stopped, into the RFID tag provided with the transmission document; and
   an error controller configured to stop a second transmission of the image data from the transmission document if the tag read unit reads tag data from the RFID tag provided with the transmission document and the tag data comprises the error data.

2. The communication apparatus according to claim 1, wherein, if the first destination and the second destination match with each other, the transmission controller controls the transmission unit to transmit the image data to the first destination.

3. The communication apparatus according to claim 1, further comprising an indication unit configured to indicate that the first destination and the second destination are different from each other if the first destination and the second destination are different from each other in the comparison result of the comparison unit.

4. The communication apparatus according to claim 2, wherein, if the first destination and the second destination are different from each other, the transmission controller controls the operation unit to accept re-inputting of the second destination of the transmission document as a re-input destination, and
   wherein the comparison unit compares the first destination and the re-input destination with each other; and
   wherein, if the first destination and the re-input destination match with each other, the transmission controller controls the transmission unit to transmit the image data to the first destination.

5. The communication apparatus according to claim 2, wherein, if the first destination and the second destination are different from each other, the transmission controller controls the operation unit to accept re-inputting of the second destination of the transmission document,
   wherein, in response to the re-inputting of the second destination, the transmission controller controls the tag write unit to write re-input execution data indicating that the second destination of the transmission document is re-inputted, into the RFID tag provided with the transmission document.

6. The communication apparatus according to claim 4, further comprising a transmission history storage unit configured to store a transmission history of a transmission document,
wherein the transmission controller adds information, indicating that the second destination of the transmission document has been re-inputted, to the transmission history corresponding to the transmission document and stores the transmission history into the transmission history storage unit.

7. The communication apparatus according to claim 2, further comprising:
an identification data acquisition unit configured to acquire document identification data, which identifies the transmission document, from the tag data corresponding to the transmission document;
a storage unit configured to store the image data of the transmission document and the document identification data corresponding to the transmission document while associating the image data and the document identification data with each other;
a hold unit configured to hold the image data of the transmission document stored in the storage unit if the transmission controller controls the transmission unit to stop transmission of the image data of the transmission document; and
a detection unit configured to detect whether new document identification data acquired by the identification data acquisition unit from tag data corresponding to a new transmission document and the document identification data stored in the storage unit match with each other when the image data of the transmission document is held by the hold unit,
wherein, if the detection unit determines that the new document identification data acquired by the identification data acquisition unit and the document identification data stored in the storage unit match with each other, the transmission controller controls the transmission unit to transmit the image data of the transmission document held by the hold unit to the first destination without reading image data from the new transmission document.

8. The communication apparatus according to claim 7, further comprising:
an identification data generation unit configured to generate the document identification data of the transmission document if transmission of the image data of the transmission document is stopped according to the comparison result of the comparison unit and the hold unit holds the data involved in the transmission document in the storage unit,
wherein the tag write unit writes the document identification data generated by the identification data generation unit into the RFID tag corresponding to the transmission document.

9. The communication apparatus according to claim 7,
wherein, when writing the document identification data into the RFID tag corresponding to the transmission document, the tag write unit sets a protection setting to prohibit editing of the document identification data.

10. A document workflow method comprising the steps of:
storing, with a tag writer, a first destination of a document on an RFID tag provided with the document;
scanning the document with a communications device;
performing a first reading operation with the communications device that comprises reading tag data comprising the first destination from the RFID tag provided with the document;
inputting a second destination into the communications device;
comparing, with the communications device, the first destination read from the RFID tag and the second destination input into the communications device;
permitting a first transmission of the document by the communications device if the first destination is the same as the second destination;
stopping the first transmission of the document by the communications device and storing, with the communications device, error data indicating that the first transmission of the document is stopped, if the first destination is different from the second destination;
performing a second reading operation with the communications device that comprises reading tag data from the RFID tag provided with the document; and
stopping a second transmission of the document if the tag data read by the second reading operation comprises the error data.

11. The document workflow method according to claim 10, further comprising the steps of:
if the first destination is not the same as the second destination, re-entering the second destination into the communications device; and
permitting transmission of the document by the communications device only if the first destination matches the re-entered second destination.

12. The communication apparatus according to claim 1,
wherein the comparison unit is configured to perform the comparison if the tag data read from the RFID tag does not comprise the error data and to not perform the comparison if the tag data read from the RFID tag comprises the error data.

13. The document workflow method according to claim 10, wherein the comparing is not performed if the tag data read by the first reading comprise the error data.

14. The document workflow method according to claim 10, further comprising the step of:
setting, with the tag writer, the error data stored in the RFID tag provided with the document to be invalid.

* * * * *